United States Patent Office 2,865,864
Patented Dec. 23, 1958

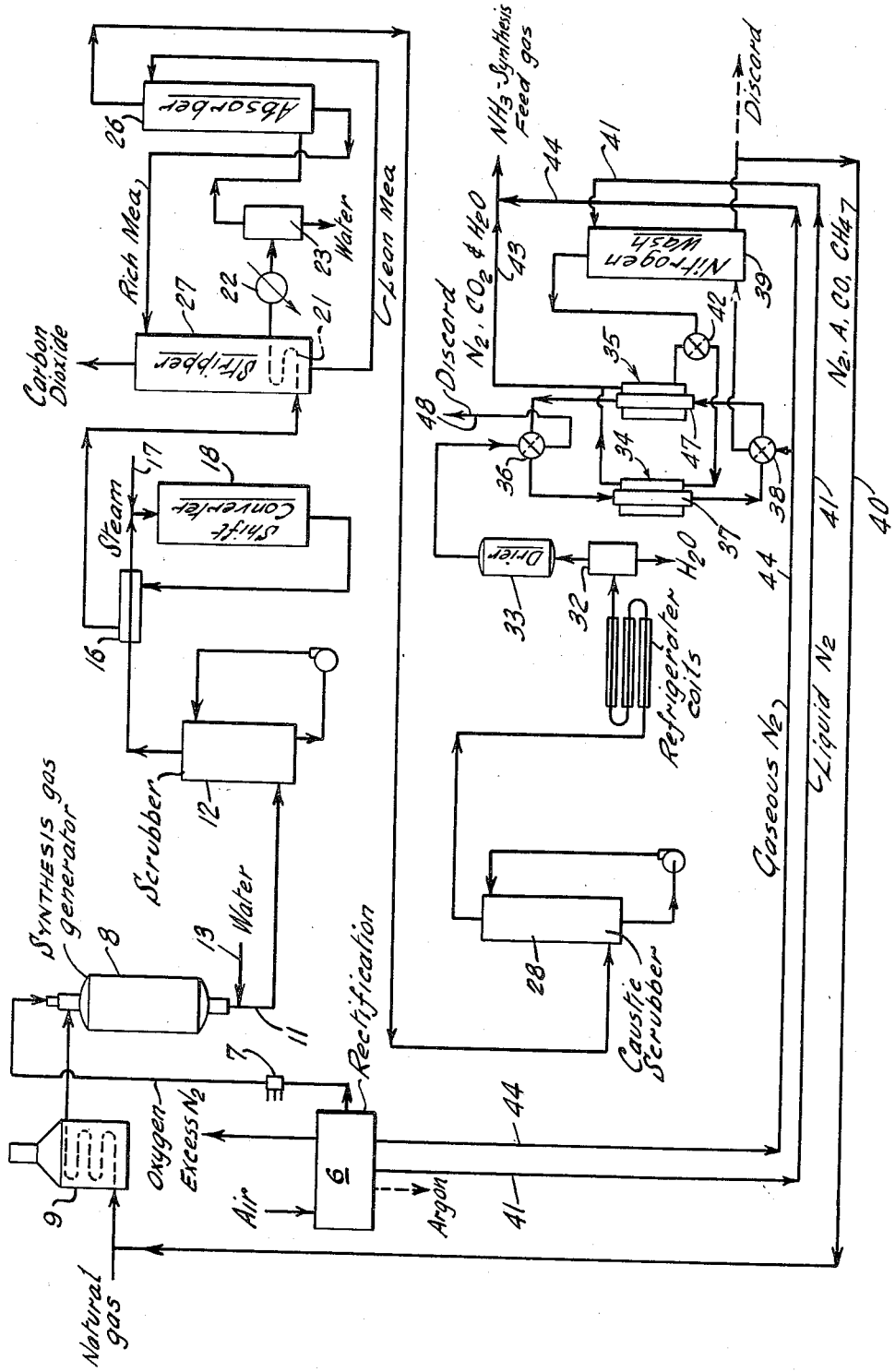

2,865,864

PROCESS FOR THE PRODUCTION OF AMMONIA SYNTHESIS FEED GAS

Du Bois Eastman, Roger M. Dille, and Ronald W. Chapman, Whittier, Calif., assignors to The Texas Company, New York, N. Y., a corporation of Delaware Application August 19, 1955, Serial No. 529,429

5 Claims. (Cl. 252—375)

This invention relates to a process for the production of ammonia synthesis feed gas. In one of its more specific aspects, this invention relates to an improved method for the removal of minor amounts of undesirable gases from a hydrogen-rich stream containing minor amounts of undesirable gases including methane. The process of this invention is particularly applicable to the production of a mixture of hydrogen and nitrogen useful in the synthesis of ammonia.

The synthesis of ammonia is effected by reacting nitrogen with hydrogen. Three volumes of hydrogen are required per volume of nitrogen. The ammonia synthesis reaction is conducted at a pressure of several thousand pounds per square inch, generally 5,000 and higher, and an elevated temperature, suitably around 950° F. A catalyst is used; for example, a catalyst prepared from magnetic iron oxide promoted with the oxides of potassium and aluminum and subsequently reduced to metallic iron, is used commercially. In commercial operations, low conversion per pass is obtained, i. e., only a limited amount of the nitrogen-hydrogen mixture is converted to ammonia each time it passes over the catalyst. A conversion of 8 to 12 percent per pass may be expected commercially. Unconverted nitrogen and hydrogen are recycled. It is evident that roughly 90 percent of the feed to the converter represents recycled gas.

Undesirable gases, generally methane (resulting from incomplete reaction of the hydrocarbon in the production of hydrogen), and argon and other inert atmospheric gases tend to accumulate at the converter by building up in concentration in the recycle gas stream. In order to maintain the concentration of the undesirable gases in the converter at a low value, it is customary to purge a portion of the recycle gas stream. This purge represents a loss of hydrogen. Usually, only about 85 percent of the hydrogen feed is ultimately converted to ammonia; the remainder is lost in purging. The importance of preparing a purified stream of feed gas for the ammonia synthesis reaction is thus apparent. The present invention provides a method for producing a highly purified ammonia synthesis feed gas.

In many ammonia plants, steam and gaseous hydrocarbons are reacted in the presence of a catalyst to produce a mixture of carbon monoxide and hydrogen. Natural gas, for example, is mixed with steam and passed over a nickel oxide catalyst in a first reactor at a temperature within the range of from about 1,200 to about 1,500° F. to yield carbon monoxide and hydrogen. A small amount of hydrocarbon, generally on the order of 3 to 5 percent of the initial feed remains unconverted. Air is introduced into the mixture of carbon monoxide and hydrogen prior to shift conversion to supply the nitrogen required for the subsequent ammonia synthesis and to consume any unconverted methane. This procedure, termed "reforming" of the gas, is usually carried out in the presence of a nickel oxide catalyst at a temperature in the range of from about 1,500 to about 1,850° F. Although methane is substantially eliminated by this procedure, a considerable quantity of carbon monoxide and hydrogen, about 15 percent, is burned to carbon dioxide and water vapor. The result is a net loss of carbon monoxide and hydrogen. In addition, argon and the other inert atmospheric gases are introduced into the system and eventually find their way into the synthesis reactor system where they can be removed only by purging. Air contains about 0.933 volume percent inert gases, mainly argon.

Recently the partial oxidation of hydrocarbons with oxygen to carbon monoxide and hydrogen has been developed commercially. A preferred process is disclosed in U. S. Patent 2,582,938 to du Bois Eastman and Leon P. Gaucher. Hydrocarbons, either gaseous or liquid, are especially suited for the production of hydrogen by reaction with oxygen. A feed hydrocarbon, for example, natural gas, is reacted with an oxygen-containing gas, preferably substantially pure oxygen, in a closed reaction zone at a temperature above about 2,200° F. Oxygen may be obtained by rectification of air. Partial oxidation of the hydrocarbon with oxygen produces a mixture of carbon monoxide and hydrogen. A small amount of methane, e. g. 0.2 to 0.5 mol percent is usually present in the product gas stream. The carbon monoxide may be reacted with steam to produce carbon dioxide and hydrogen; one volume of hydrogen is produced for each volume of carbon monoxide reacted. Following the addition of nitrogen and the removal of carbon dioxide and other undesired components, ammonia synthesis feed gas is obtained.

Carbon monoxide is usually converted to carbon dioxide by reaction with steam to produce additional hydrogen at about 750° F. in the presence of an iron catalyst. Iron oxide promoted with oxides of chromium, potassium, magnesium and aluminum is a commercial catalyst for this reaction. After purification, in which carbon dioxide and carbon monoxide are removed from the gas stream, the purified mixture of hydrogen and nitrogen required as synthesis feed gas is obtained. Carbon dioxide may be removed by scrubbing the gas with water or an amine, e. g. monoethanolamine, or by a combination of these procedures. Carbon monoxide may be removed by scrubbing the gas with an aqueous solution of cuprous ammonium chloride ($Cu(NH_3)_2Cl$), which also removes carbon dioxide. Various other salts may be used as are known in the art. A caustic wash, i. e. contact between the gas and a solution of sodium hydroxide, is also sometimes used to effect substantially complete removal of carbon dioxide from the synthesis feed gas before it is passed to the ammonia synthesis reactor.

As pointed out above, gases other than hydrogen and nitrogen are most undesirable in the ammonia synthesis reactor. It is desirable therefrom, to remove the undesirable gases from the ammonia synthesis feed gas before they enter the ammonia synthesis section of the plant.

In the generation of carbon monoxide and hydrogen by reaction of a hydrocarbon with oxygen, either substantially pure oxygen or oxygen-enriched air obtained by rectification of air, is used to supply the oxygen requirements of the process. In the rectification of air it is possible to take off argon with either the oxygen fraction or the nitrogen fraction, argon having a boiling point between that of oxygen and that of nitrogen, or to separately withdraw the argon. Argon is a commercially valuable by-product of air rectification; generally it is desirable to separately recover at least the major portion of the argon as a by-product. In any event, oxygen substantially completely free from argon may be obtained by air rectification so that argon is eliminated from the raw ammonia synthesis feed gas.

The effluent from the synthesis gas generator contains a small amount of unconverted hydrocarbon. Regardless of whether gaseous or liquid hydrocarbon feed is supplied to the generator the unconverted hydrocarbon is essentially methane. Unless the methane is removed from the synthesis gas stream, it finds its way into the ammonia synthesis reactor where it acts as an undesirable diluent. It is not practical to remove the methane by reaction with air or oxygen because of the relatively low methane content in the raw synthesis feed gas and excessive consumption of hydrogen and carbon monoxide. The methane, as well as other undesirable gases, may be removed from the feed gas by cooling the gas stream sufficiently to condense the methane and other higher boiling gases from the hydrogen-rich gas stream following shift conversion and removal of carbon dioxide.

In the production of ammonia synthesis feed gas from coke oven gases, the hydrocarbons and other unwanted gases are sometimes removed by partial liquefaction. The removal of impurities by liquefaction is usually carried out in stages. The hydrogen-rich gas stream is cooled under pressure, e. g., 12 atmospheres, to a temperature sufficiently low to condense the hydrocarbons, e. g., −230° F.; hydrocarbons are separated from the gas stream; and the gas is further cooled to the temperature of liquid nitrogen, e. g., −315 to −320° F.; and scrubbed with liquid nitrogen. The liquid nitrogen wash removes the last traces of impurities, including carbon monoxide, from the gas stream. The cold purified gas stream is passed in indirect heat exchange with the incoming hydrogen-rich gas stream. A very pure synthesis gas stream is so produced.

The amount of unconverted methane present in the hydrogen-rich gas stream produced by reaction of a hydrocarbon with oxygen at a temperature above about 2,500° F. is usually within the range of 0.2 to 0.5 mol percent. This small amount of residual methane does not warrant the expense of removal by secondary reforming or conventional partial liquefaction. Removal of carbon monoxide is necessary, however, and at the same time it is desirable to remove methane. A nitrogen wash may be employed to prepare a very pure hydrogen-nitrogen mixture without the necessity for intermediate removal of hydrocarbons provided that certain conditions of operation are observed.

The nitrogen wash must be conducted at about −320° F. at 260 p. s. i. g. to maintain proper distribution between liquid nitrogen in the tower bottoms and nitrogen taken overhead with the hydrogen. If an attempt is made to cool to −320° F., a mixture consisting of hydrogen and methane and containing more than 0.15 mol percent methane (corresponding to about 0.14 mol percent in the generator effluent), the methane, which has a melting point of about −297° F. at atmospheric pressure, crystallizes causing plugging of the gas passages of the heat exchange equipment.

We have found that the freezing of methane may be prevented by incorporating argon in the gas feed to the liquid nitrogen wash tower. This permits feeding the raw hydrogen stream, following shift conversion and removal of carbon dioxide and water, directly to a liquid nitrogen wash system without the intermediate separation of hydrocarbons. We have found also, that carbon monoxide and nitrogen also may be used to prevent freezing of methane, but are not as effective as argon.

This invention provides an improved process for the production of a mixture of essentially pure nitrogen and hydrogen. The process of this invention is particularly applicable to the production of a mixture of nitrogen and hydrogen in the proportions required for the synthesis of ammonia. An important advantage of this process, e. g., as applied to the synthesis of ammonia, is that it produces a very pure synthesis gas, i. e., synthesis gas containing a very low inert gas content.

In a preferred method of operation in accordance with this invention, air is rectified to produce an oxygen-rich fraction, containing in excess of 90 mol percent oxygen and preferably on the order of 95 mol percent oxygen, and a nitrogen fraction of at least 99.5 percent purity. The oxygen fraction is reacted with a carbonaceous fuel at a temperature above about 2,200° F. The product gas is cooled, subjected to the water-gas shift reaction converting carbon monoxide to carbon dioxide, and treated for the removal of carbon dioxide and water thereby producing a hydrogen-rich gas stream containing small amounts of carbon dioxide and methane.

Sufficient nitrogen, argon, carbon monoxide, or various combinations of these gases are maintained in the gas stream at this point in the process to satisfy the following equation:

$$A + 0.5CO + 0.33N_2 > 0.69CH_4 + 0.65$$

wherein $A$, $CO$, $N_2$ and $CH_4$ represent the mol percent of argon, carbon monoxide, nitrogen and methane, respectively, in the gas stream. The resulting gas stream is then cooled to a very low temperature and contacted with liquid nitrogen of at least 99.5 percent purity whereupon the undesirable constituents, e. g., methane, argon and carbon monoxide, are condensed. At the same time, some of the nitrogen is vaporized into the hydrogen stream. The unvaporized liquid nitrogen and condensed constituents are substantially completely removed from the gas stream. A mixture of hydrogen and nitrogen of unusual purity results.

The process of our invention will be more readily understood by reference to the following detailed example and the accompanying drawing. The drawing is a diagrammatic view illustrating a preferred form of the process of our invention.

With reference to the drawing, which illustrates a specific example of an application of the process of this invention to the production of ammonia synthesis feed gas, air is rectified in a rectification plant 6 to yield a substantially pure nitrogen fraction and an oxygen-rich fraction, containing in excess of approximately 90 percent oxygen by volume, preferably on the order of 95 percent oxygen by volume. Both liquid nitrogen and gaseous nitrogen are available from the rectification plant in substantially pure form for use as indicated later. A stream of the oxygen fraction from the rectification plant is passed to a compressor 7 and delivered to a synthesis gas generator 8.

Natural gas is preheated in preheater 9 and passed to the synthesis gas generator 8. The oxygen and natural gas are separately introduced into the generator and mixed with one another within the generator. Argon is preferably introduced into the synthesis gas at the generator as explained in greater detail hereinafter. The synthesis gas generator is a compact, unpacked reaction zone having a relatively small amount of surface in relation to its volume. A preferred synthesis gas generator is disclosed in U. S. Patent 2,582,938 to Du Bois Eastman and Leon P. Gaucher. The synthesis gas generator is autogenously maintained at a temperature above about 2,250° F. by reaction between the oxygen and natural gas.

The raw synthesis gas from the gas generator, consists essentially of hydrogen and carbon monoxide and usually contains less than about 0.5 percent residual methane by volume. The raw synthesis gas is discharged from the synthesis gas generator through transfer line 11 to the base of a scrubber 12. Quench water is injected directly into transfer line 11 through line 13. Preferably the gas stream is quickly cooled to a temperature not above about 600° F. Quenching by direct water injection requires from about 0.5 to about 1.0 mol water per mol generator effluent. About 0.75 mol water per mol of product gas reduces the temperature of the raw synthesis gas from a generator temperature of 2,600° F. to about 450° F. The cooled gases enter scrubber 12 where the gas is further scrubbed with water continuously recirculated from the bottom to the top of the vessel. Bubble cap trays preferably are provided to insure intimate contact between the water and the gas. The water-washed gas is discharged from the scrubber through heat exchanger 16 where it is heated to a temperature on the order of 700 to 750° F. The preheated gas is mixed with steam from line 17 and passed into shift converter 18 operated at a temperature of 700 to 750° F. The carbon monoxide, which generally comprises approximately 30 percent by volume of the synthesis gas, is almost completely reacted with steam in the shift converter in the presence of iron catalyst to form equivalent amounts of hydrogen and carbon dioxide. The product gas from the shift converter is at a temperature of about 750° F. and contains approximately 1.5 percent nitrogen by volume and approximately 2 percent residual carbon monoxide by volume on a dry, carbon dioxide-free basis.

The product from the shift converter passes through heat exchanger 16 where it supplies the heat necessary to preheat the gas feed stream to the shift converter. This gas stream is passed through a second heat exchanger 21, the purpose of which will be described hereinafter, and is further cooled in a cooler 22 to about 110° F. Water condensed from the gas stream is separated from the gas in separator 23. The cooled gas then passes into absorber 26 where it is contacted with monoethanolamine (MEA) solution for removal of carbon dioxide. MEA solution rich in carbon dioxide is passed to a stripper 27 where the carbon dioxide is driven off by heat supplied by heat exchange with the feed gas stream. MEA solution lean in carbon dioxide is returned to the absorber 26.

The gas stream consisting essentially of hydrogen, but still containing small amounts of carbon dioxide, carbon monoxide, methane, and argon, is then passed to a caustic scrubber 28 where the gas is contacted with a ten percent solution of sodium hydroxide. Caustic is continuously recirculated from the bottom to the top of the scrubber by pump 29. Provision is made (not illustrated) for adding fresh caustic solution to the scrubber and for discarding a part of the used solution to maintain the required concentration of the solution. Provision may also be made (not illustrated) for water washing the gas following caustic wash.

The caustic-scrubbed gas is primarily hydrogen, but contains some nitrogen, part of which is derived from the natural gas, as well as some carbon monoxide, methane, and argon. The gas also contains some water vapor. This gas is cooled by refrigeration in ammonia-refrigerated coils 31 to a temperature of about 40° F. Condensed water is separated from the gas stream in separator 32. The partially dried gas then passes through a drier 33 containing alumina to reduce the water vapor to less than two parts per million (i. e. dew point less than —60° F.). Silica gel or other desiccant may be used in place of alumina in the drier.

The dry gas stream is then cooled to approximately —315° F. A pair of heat exchangers 34 and 35 are provided for this purpose. By means of a switching valve 36, the gas stream is directed through one element 37 of heat exchanger 34 where it is cooled to approximately —315° F. In this exchanger, the final traces of carbon dioxide and water are condensed from the gas stream and deposited as solids on the surface of the heat exchanger element 37. The cold gas stream is then directed through a switching valve 38 to the bottom of a nitrogen wash tower 39. Here the gas is contacted with liquid nitrogen obtained from the air rectification plant 6 and introduced to the tower through line 41. The wash tower is provided with bubble cap plates to insure intimate countercurrent contact between the liquid nitrogen and the gas stream. Pure liquid nitrogen flowing downward through the tower condenses argon, carbon monoxide and methane. At the same time, a portion of the liquid nitrogen is vaporized into the gas stream. The gas leaving the top of the tower is essentially free from components other than hydrogen and nitrogen. The resulting gas consists of a mixture of hydrogen and nitrogen which contains only about 0.04 percent argon and less than one part per million of carbon monoxide.

The cold purified gas from the nitrogen wash tower 39 is directed by a switching valve 42 into heat exchanger 34 to cool the incoming gas stream. Following heat exchange, the purified gas stream is discharged through line 43 and mixed with sufficient gaseous nitrogen from the air rectification plant 6, via line 44, to produce an ammonia-synthesis feed gas containing three parts hydrogen by volume and one part nitrogen.

The liquid nitrogen reaching the bottom of the nitrogen wash tower 39 contains condensed argon, carbon monoxide, and hydrocarbon. The wash tower bottoms are continuously withdrawn and may be recycled totally or in part through line 40. Preferably the recycle stream from the nitrogen wash tower reenters the gas generation system with the natural gas feed to the preheater as shown in the drawing. The recycle stream may reenter the system following the synthesis gas generator. Due to the carbon monoxide contained in the recycle stream, it is preferable to introduce the recycle stream ahead of the shift converter to prevent the buildup of carbon monoxide.

If 75 percent or more of the argon in the air supplied to the rectification plant is fed to the gas generator with the oxygen, it is generally not necessary to recycle bottoms from the nitrogen wash tower in order to maintain sufficient argon in the feed to the nitrogen wash tower to prevent solidification of methane. The usual practice in air rectification is to take the greater portion of the argon, i. e. more than 50 percent, overhead with the nitrogen stream. This is not generally practical in systems employing nitrogen wash for the gas purification due to the purity requirements of the liquid nitrogen supplied to the nitrogen wash tower. Often argon is separately recovered as a salable by-product. In such cases, recycling nitrogen wash tower bottoms may be used to maintain the desired argon concentration in the feed to the nitrogen wash system. Total recycle of the nitrogen wash tower bottoms permits operation with very little argon addition. Almost complete recovery of argon as a by-product is possible once the purification system is charged with argon.

As previously mentioned, water and carbon dioxide condense from the gas stream in passing through heat exchange element 37 and deposit as solids on the surfaces of the heat exchange element. To prevent the build-up of these deposits to the point where the heat exchanger becomes plugged or has its efficiency seriously impaired, provision is made for periodically discontinuing flow of the hydrogen-rich gas stream through the exchanger and for flushing the heat exchanger element with gaseous nitrogen from the air rectification plant. This is accomplished by admitting nitrogen from line 44 through switching valve 38 to a heat exchange element.

As illustrated in the drawing, gaseous nitrogen is introduced to element 47 of heat exchanger 35 (which corresponds to element 37 of heat exchanger 34). On passing through heat exchange element 47 (or 37), the warm stream of gaseous nitrogen vaporizes condensed carbon dioxide and water and removes these deposits from the heat exchanger element. This impure nitrogen stream is discarded through line 48. It will be understood that periodically, by changing switching valves 36, 38 and 42 to the positions indicated by the dotted lines, the stream of gas from drier 33 is directed through heat exchange element 47 of exchanger 35 in heat exchange with cold gases from the nitrogen wash tower while at the same time gaseous nitrogen from line 41 is passed through heat exchange element 37 to vaporize the carbon dioxide and water deposits therein and discarded through line 48.

EXAMPLE 1

In a specific example, natural gas of the following composition is preheated to 915° F. and passed to a synthesis gas generator.

*Natural gas composition*

| Component: | Mol percent |
|---|---|
| Methane | 87.1 |
| Ethane | 7.9 |
| Propane and heavier | 2.0 |
| Nitrogen | 1.9 |
| Carbon dioxide | 1.1 |

Air is rectified at 80 p. s. i. g. to yield an oxygen fraction containing about 94.8 mol percent oxygen, 3.5 percent argon and 1.7 percent nitrogen and a nitrogen fraction containing approximately 99.8 mol percent nitrogen and 0.2 mol percent argon.

The oxygen-rich stream is supplied to the generator at 295° F. where it is mixed with the natural gas in the proportions of 1.455 cubic feet of natural gas per cubic foot of oxygen-containing gas. The gas generator is operated at 340 p. s. i. g. and 2,600° F. The residence time of the gases in the generator, based on the volume of the product gas, is about 3.5 seconds.

The product gas from the generator, prior to quenching, has the following approximate composition:

*Raw synthesis gas*

| Component: | Mol percent |
|---|---|
| Hydrogen | 56.8 |
| Carbon monoxide | 32.0 |
| Water | 7.6 |
| Carbon dioxide | 1.4 |
| Nitrogen | 1.2 |
| Argon | 0.8 |
| Methane | 0.2 |

The raw synthesis gas is quenched with water to 450° F. by direct water injection followed by scrubbing at 340 p. s. i. g., reheated to 700° F., mixed with steam at 750° F. and passed over an iron shift conversion catalyst. The product gas leaves the shift converter at 750° F. and contains approximately 2 mol percent carbon monoxide on a dry, carbon dioxide-free basis. The gas is cooled to 110° F. to condense water, which is separated from the gas, and scrubbed with methanolamine and caustic solution successively to effect removal of carbon dioxide. The gas stream, at a pressure of 295 p. s. i. g. is cooled to 40° F., condensate is separated from the gas, and the gas stream is passed over alumina. The dry gas, at 275 p. s. i. g., is cooled to −315° F. and scrubbed with liquid nitrogen at about −320° F. The composition of the dry gas to the nitrogen wash system is as follows:

*Feed gas to nitrogen wash*

| Component: | Mol percent |
|---|---|
| Hydrogen | 95.7 |
| Nitrogen | 1.3 |
| Argon | 0.9 |
| Carbon monoxide | 1.9 |
| Methane | 0.2 |

The purified gas stream is heat exchanged with the dry gas in switching heat exchangers. No trouble is experienced with freezing of methane in the heat exchangers or nitrogen wash tower. The bottoms from the nitrogen wash tower has the following composition:

*Nitrogen wash towel bottoms*

| Component: | Mol percent |
|---|---|
| Hydrogen | 2.9 |
| Nitrogen | 51.8 |
| Argon | 13.4 |
| Carbon monoxide | 29.8 |
| Methane | 2.1 |

The nitrogen wash tower bottoms is discarded. The overhead from the nitrogen wash tower has the following composition:

*Purified gas from nitrogen wash*

| Component: | Mol percent |
|---|---|
| Hydrogen | 91.8 |
| Nitrogen | 8.2 |
| Argon | p. p. m.__ <10 |
| Carbon monoxide | p. p. m.__ <1 |
| Methane | p. p. m.__ <1 |

Nitrogen-rich gas from the air rectification plant, the composition of which is given above, is mixed with the purified gas from the nitrogen wash tower to yield an ammonia synthesis feed gas of the following composition:

*Ammonia synthesis feed gas*

| Component: | Mol percent |
|---|---|
| Hydrogen | 74.74 |
| Nitrogen | 24.92 |
| Argon | 0.04 |
| Carbon monoxide | p. p. m.__ <1 |

EXAMPLE 2

In the system of Example 1, the air rectification operation is modified to remove argon as a by-product. The composition of the nitrogen fraction remains unchanged. The oxygen fraction contains 99 mol percent oxygen and 1 mol percent argon. The argon concentration in the feed to the nitrogen wash tower is maintained by recycling 72.5 percent of the nitrogen wash tower bottoms liquid to the synthesis gas generator.

EXAMPLES 3–33

A number of runs were made to determine the effect of nitrogen, carbon monoxide and argon on the formation of solid at 286 p. s. i. a. and −320° F. in gas stream containing from 0.5 to 5 mol percent methane and about 95 mol percent hydrogen. The gas mixtures were passed through a tube immersed in a constant temperature bath. Runs were continued until the tube plugged solid or, if no plug formed, until the composition of gas leaving the tube corresponded to the sample under test. The effects of nitrogen, carbon monoxide, and argon, individually and in combination, are indicated in the following table.

| Example | Run No. | Mol Percent Present | | | | Formed Plug |
|---|---|---|---|---|---|---|
| | | CH₄ | CO | A | N₂ | |
| 3 | 8 | 0.41 | | | | Yes. |
| 4 | 98 | 0.56 | 1.69 | | | Yes. |
| 5 | 84 | 0.54 | 1.70 | | 1.02 | No. |
| 6 | 102 | 0.57 | 1.31 | | 1.01 | Yes. |
| 7 | 72 | 0.55 | 2.60 | | 0.60 | No. |
| 8 | 124 | 0.67 | 2.41 | | | No. |
| 9 | 112 | 0.77 | 2.09 | | | Yes. |
| 10 | 26 | 1.15 | 1.04 | | | Yes. |
| 11 | 54 | 1.41 | 3.40 | | | No. |
| 12 | 116 | 1.70 | 2.10 | | | Yes. |
| 13 | 29 | 0.48 | | 0.81 | | Yes. |
| 14 | 85 | 0.50 | | 1.04 | | No. |
| 15 | 83 | 0.55 | | 0.97 | 2.05 | No. |
| 16 | 79 | 0.63 | | 1.14 | 1.03 | No. |
| 17 | 100 | 0.64 | | 0.92 | | Yes. |
| 18 | 89 | 0.69 | | 1.04 | 0.85 | No. |
| 19 | 75 | 0.75 | | 1.42 | 1.31 | No. |
| 20 | 94 | 0.90 | | 1.06 | | Yes. |
| 21 | 66 | 0.93 | | 1.84 | 1.89 | No. |
| 22 | 19 | 1.02 | | 1.14 | | Yes. |
| 23 | 25 | 1.06 | | 2.28 | | No. |
| 24 | 52 | 5.17 | | 4.89 | | No. |
| 25 | 49 | 5.25 | | 3.64 | | Yes. |
| 26 | 96 | 0.52 | | | 2.44 | Yes. |
| 27 | 87 | 0.55 | | | 2.0 | Yes. |
| 28 | 122 | 0.60 | | | 3.21 | No. |
| 29 | | 0.85 | | | 3.15 | Yes. |
| 30 | 60 | 0.27 | 1.81 | 0.26 | 0.89 | No. |
| 31 | 62 | 0.54 | 1.79 | 0.26 | 0.82 | No. |
| 32 | 73 | 0.65 | 2.09 | 0.24 | 1.06 | No. |
| 33 | 53 | 1.18 | 2.39 | 0.97 | 1.39 | No. |

Although Examples 1 and 2, above, and much of the detailed description of the process, refer to the generation of gas from hydrocarbons, it is to be understood that the present process may be applied to the generation of nitrogen and hydrogen from a solid fuel, e. g. coal, as well as from hydrocarbons. Generally the methane content of the raw gas obtained by partial oxidation of the solid fuel is higher than the methane content of synthesis gas generated from hydrocarbons. In any event, the methane content of the product gas seldom exceeds one to two mol percent. As will be evident from the tabulated data in Examples 3 to 33, it is possible to prevent the freezing of methane even in concentrations as high as 5 mol percent. Since argon is the most effective of the gases for depressing the freezing point of methane, it preferably is included, particularly with the higher concentrations of methane. In general, it is desirable to limit the concentration of carbon monoxide in the feed gas stream to the nitrogen wash system to about 5 mol percent, preferably not more than 2 mol percent, and the concentration of nitrogen to about 5 mol percent. In most cases it is preferable to maintain the nitrogen content of the feed gas stream to the nitrogen wash system below about 3 mol percent. The amounts of the various gases required to prevent freezing of methane are readily determined from the formula given above.

Obviously, many modifications and variations of the invention, as hereinbefore set forth, may be made without departing from the spirit and scope thereof, and therefore only such limitations should be imposed as are indicated in the appended claims.

We claim:

1. A process for the production of a mixture of hydrogen and nitrogen in predetermined proportions comprising subjecting air to liquefaction and rectification producing an oxygen-rich fraction containing argon and a nitrogen fraction substantially free from oxygen and argon; reacting a carbonaceous fuel with said oxygen-rich fraction in a gas generation zone under conditions of partial combustion producing carbon monoxide and hydrogen as the principal products of reaction and yielding a product gas comprising carbon monoxide, hydrogen, argon, and methane; converting said carbon monoxide to carbon dioxide with concomitant production of hydrogen by reaction with steam in a water gas shift reaction zone; separating carbon dioxide and water from the effluent of said water gas shift reaction zone forming a hydrogen-rich gas stream containing minor amounts of methane, nitrogen, and argon; cooling said hydrogen-rich gas stream to a temperature below the freezing point of methane and contacting said gas stream with said nitrogen fraction in liquid phase condensing methane and argon from said gas stream; separating a gaseous mixture of nitrogen and hydrogen substantially completely free from other constituents from the liquid fraction comprising nitrogen, argon, and methane; and vaporizing and returning a sufficient amount of said liquid fraction to said gas generation zone to maintain the concentration of argon in said hydrogen-rich gas stream at least equal to the concentration required to prevent freezing of methane and effective to satisfy the following formula:

$$A+0.5CO+0.33N_2 > 0.69CH_4+0.65$$

wherein A, CO, $N_2$, and $CH_4$ represent the concentrations of argon, carbon monoxide, nitrogen, and methane, respectively, expressed as mol percent in said hydrogen-rich gas stream, none of which exceed 5 mol percent.

2. In a process for the production of hydrogen-nitrogen mixtures substantially free from other gases wherein a hydrogen-rich gas stream containing from about 0.2 to about 5.0 mol percent methane and not more that 3 mol percent carbon monoxide is contacted with substantially pure liquid nitrogen effecting substantially complete condensation of gaseous constituents other than hydrogen and nitrogen; a mixture of gaseous nitrogen and hydrogen is separated from the resulting condensate comprising liquid nitrogen, carbon monoxide, and methane; and said mixture of gaseous hydrogen and nitrogen is passed in indirect heat exchange with said hydrogen-rich stream containing carbon monoxide and methane; and wherein the freezing of methane normally occurs in said heat exchange step; the improvement which comprises suppressing the freezing of methane in said heat exchange step by including in said hydrogen-rich gas stream to said heat exchange step at least one gaseous freezing point depressant in addition to any normally contained therein, said freezing point depressant being selected from the group consisting of argon, carbon monoxide, and nitrogen effective to satisfy the following formula:

$$A+0.5CO+0.33N_2 > 0.69CH_4+0.65$$

wherein A, CO, $N_2$, and $CH_4$ represent the concentration of argon, carbon monoxide, nitrogen, and methane respectively, expressed as mol percent in said hydrogen-rich gas stream, none of which exceed 5 mol percent.

3. A process according to claim 2 wherein argon and nitrogen are added to said hydrogen-rich stream as said freezing point depressants.

4. A process as defined in claim 2 wherein said hydrogen-rich gas stream supplied to said heat exchange step contains 1 to 3 mol percent carbon monoxide, 0.5 to 2 mol percent argon, not more than 2 mol percent methane, and not more than 5 mol percent nitrogen.

5. A process as defined in claim 2 wherein said hydrogen-rich gas stream as initially produced contains argon and wherein a portion of said condensate is recycled to supplement the amounts of said gaseous freezing point depressants contained in said hydrogen-rich gas stream supplied to said heat exchange step in an amount effective to satisfy said formula.

References Cited in the file of this patent

UNITED STATES PATENTS 1,957,744   Wietzel et al. _____ May 8, 1934